Jan. 5, 1960  W. J. GREENE  2,920,183
MAGNETIC OSCILLATION OF WELDING ARC
Filed Feb. 12, 1957  2 Sheets-Sheet 1
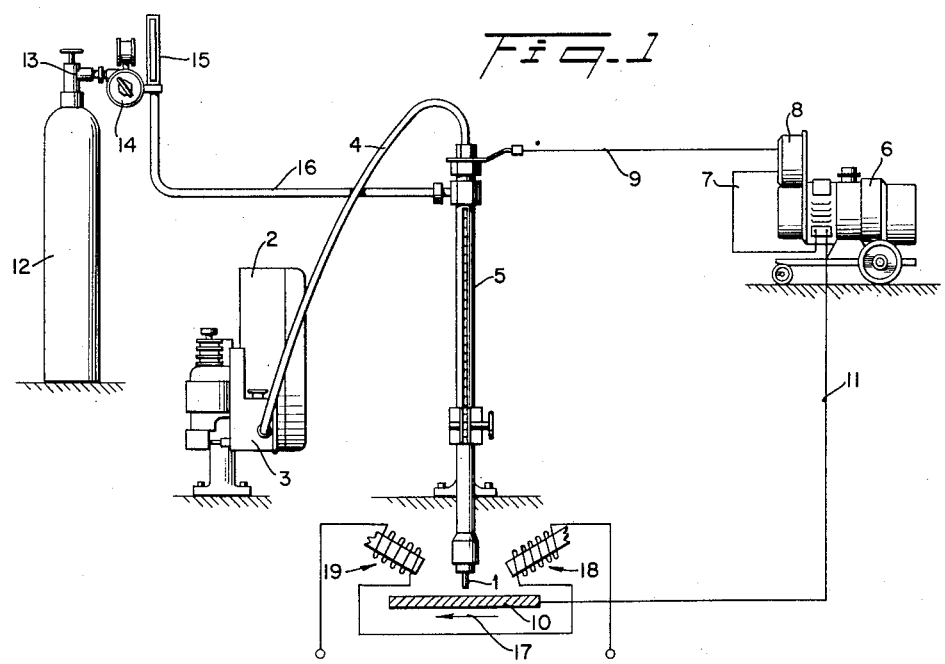
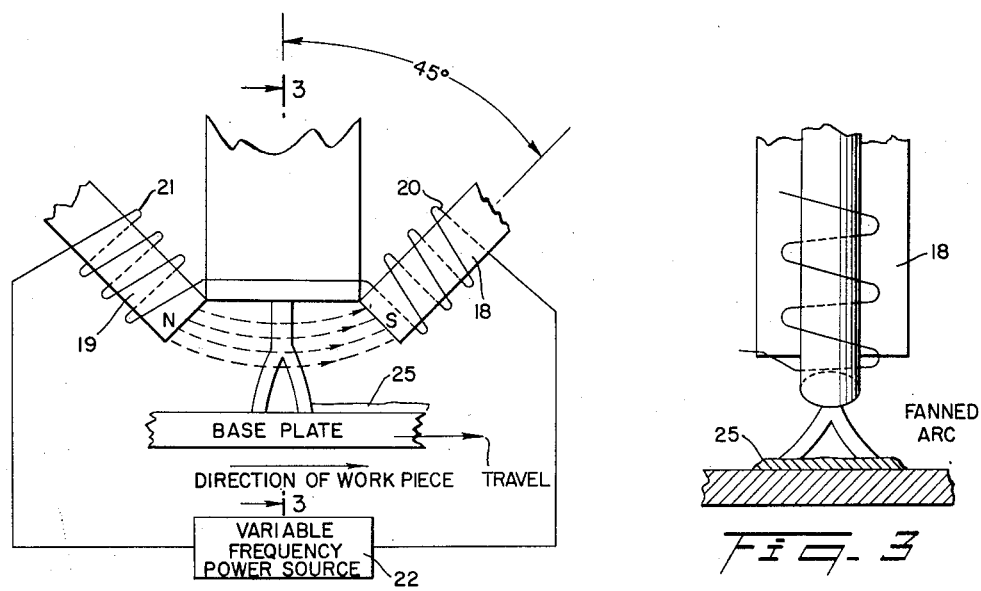
INVENTOR.
WILLIAM J. GREENE
BY
ATTORNEY & AGENT Jan. 5, 1960 W. J. GREENE 2,920,183
MAGNETIC OSCILLATION OF WELDING ARC
Filed Feb. 12, 1957 2 Sheets-Sheet 2

INVENTOR.
WILLIAM J GREENE
BY
ATTORNEY & AGENT

United States Patent Office 2,920,183
Patented Jan. 5, 1960

2,920,183

MAGNETIC OSCILLATION OF WELDING ARC

William J. Greene, Scotch Plains, N.J., assignor to Air Reduction Company, Incorporated, New York, N.Y., a corporation of New York Application February 12, 1957, Serial No. 639,779

10 Claims. (Cl. 219—123)

This invention relates to a method for electric arc welding and particularly for welding to form a wide, flat, low penetration bead suitable for a surfacing operation such as an overlay.

The invention is described herein as applied to inert gas shielded arc welding, although the invention in its broader aspects may be applied to other types of arc welding.

It is common in the welding art to provide surface layers of metal on a body composed of a different metal. Typically, this is done to provide better wear resistant qualities in the surface metal. For example, a surface coating of aluminum bronze may be welded over steel for that purpose. Other surfacing operations are carried out with various metals and for various purposes. In many such operations, it is desirable to spread the weld material as widely as possible with each pass of the welding head, in order to utilize the material more efficiently and to reduce the time necessary for covering a given area. The spreading of the bead has the advantage that the heat of the weld does not penetrate as far into the body of the material. Consequently the portion of the material which may be adversely affected by the heat of the weld is minimized.

In welding processes and apparatus of the prior art, it has been the practice in such surfacing operations to oscillate the welding head mechanically, transversely of the path of movement of the workpiece, in order to secure this wide distribution of the weld material. Such a mechanical oscillating arrangement requires a complicated and cumbersome arrangement for supporting and moving the weld head.

It is now proposed to spread the bead of weld material by electromagnetically oscillating the arc, allowing the welding head itself to travel a linear path with respect to the workpiece. In this connection, it has been discovered that there is a critical relationship between the frequency of oscillation of the arc and the time required for the drops of metal to move between the welding electrode and the workpiece. This time is hereinafter referred to as the "drop transfer time." Specifically, the drop transfer time must be less than one-half cycle of the arc oscillation. Preferably, it should be less than one-quarter cycle.

An object of the present invention is to provide an improved arc welding process suitable for surfacing operations.

Other objects and advantages of the invention will become apparent from a consideration of the following description and claims, taken together with the accompanying drawings.

In the drawings:

Fig. 1 is a somewhat diagrammatic illustration of one form of welding apparatus suitable for practicing the invention;

Fig. 2 is a diagrammatic illustration similar to a fragment of Fig. 1, but on an enlarged scale;

Fig. 3 is a cross-sectional view taken along the line 3—3 of Fig. 2;

Figure 4:
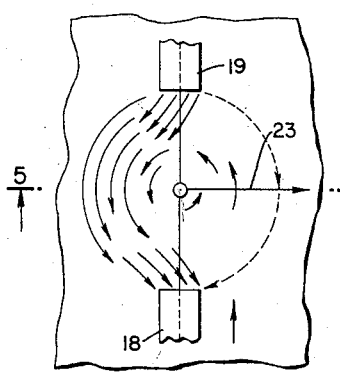
Fig. 4 is a cross-sectional view showing the magnetic field set up by the apparatus of Figs. 1 and 2, and its effect on an electric arc during one half-cycle.

In Fig. 1, an electrode wire 1 is fed from a reel 2 by a motor driven feed mechanism 3. The wire 1 is guided from the feed mechanism 3 through a tubular casing 4 to a welding gun 5 of the machine type. The welding current is provided from a conventional D.C. power supply 6. One terminal of the power supply is connected to the welding gun by a conductor 7, a contactor 8 and a conductor 9. The current is transmitted through suitable electrical connections to the electrode wire 1 within the welding gun 5. The other terminal of the power supply 6 is connected to a workpiece 10 by means of a conductor 11. Shielding gas (helium or argon), is supplied from a compressed gas cylinder 12 through a conventional cylinder valve 13, a pressure regulator 14, a flow meter 15 and a conduit 16 to the welding gun 5. The shielding gas emerges from the gun nozzle as a non-turbulent flow stream enveloping the arc end of the electrode, the arc, and the weld puddle.

In the apparatus shown, the workpiece 10 is moved relative to the welding gun or head by suitable mechanism, so that the relative motion of the workpiece is in the direction of the arrow 17 of Fig. 1.

As the workpiece 10 approaches the welding gun 5, it passes under an electromagnet generally indicated at 18. It then passes under the gun 5 and adjacent the electrode wire and thereafter passes the end of another electromagnet generally indicated at 19. The electromagnets 18 and 19 are best illustrated in Figs. 2 and 3. As shown in Fig. 2, the electromagnet 18 is provided with a winding 20 and the electromagnet 19 is provided with a winding 21. These two windings are connected in series through an obvious circuit with a variable frequency power source schematically indicated at 22. The directions of winding of the coils 20 and 21 and their electrical connections are such that the ends of the electromagnet cores nearest the arc are always of opposite polarities. During one half-cycle of the power source 22, the magnetic field due to the electromagnets 18 and 19 reacts with the field due to the arc current itself in the manner illustrated in Fig. 4. The field of the arc current is generally circular in a counterclockwise direction as viewed in Fig. 4. The field of the electromagnets assuming a direction from top to bottom as viewed in Fig. 4, opposes the field due to the arc current on the right-hand side of the center line through the arc and aids the field due to the arc current on the left-hand side of the arc current through the arc. There results a distortion of the auxiliary magnetic field with most of the field being crowded to the left of the center line as viewed in Fig. 4. There results a force acting on the metal particles of the arc, tending to move them to the right as viewed in Fig. 4, as illustrated by the arrow 23.

Figure 6:
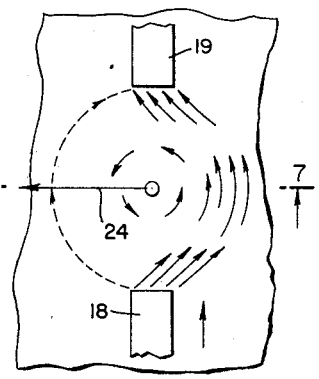
Fig. 6 is a view similar to Fig. 4, showing the effect of the magnetic fields during the opposite half-cycle.

The conditions on the other half-cycle are shown in Fig. 6. The direction of the field due to the arc current remains the same, but the field due to the electromagnets is now reversed so that the two fields aid each other on the right-hand side of the line and oppose each other on the left-hand side. There results a force acting to the left as viewed in Fig. 6 as shown by the arrow 24.

Figure 7:
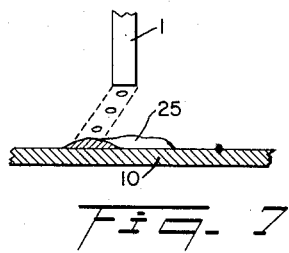
Fig. 7 is a cross-sectional view taken along the line 7—7 of Fig. 6.

As a result of the oscillation of the field, the metal particles proceeding from the electrode wire 1 to the workpiece 10 alternately swing first to one side and then the other side of the center line of the path of movement of the workpiece relative to the electrode wire 1. This swinging movement is best illustrated in Figs. 5 and 7.

Figure 5:
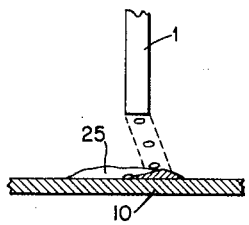
Fig. 5 is a cross-sectional view taken along the line 5—5 of Fig. 4.
Figure 8:
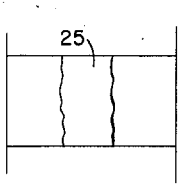
Fig. 8 is a plan view showing a weld bead formed by the method of the invention.
Figure 9:
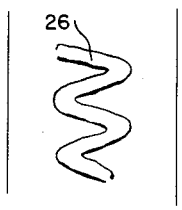
Fig. 9 is a view similar to Fig. 8, showing a form of weld bead which may be encountered if the relationship between the speed of workpiece travel and the frequency of oscillation is not properly controlled.

If the speed of travel of the workpiece is made sufficiently slow as compared to the frequency of the oscillations of the arc, then the resulting bead will have a contour such as that illustrated in Figs. 5 and 8 by the reference numeral 25. If the workpiece moves too fast with reference to the frequency of oscillation of the arc, a sinuous bead will be deposited as illustrated at 26 in Fig. 9.

The best results are secured with a direct current welding arc and a square wave A.C. field. However, since a sine wave current is more easily obtained at least from commercial sources, than a square wave current, it may be preferable in some cases to use a sine wave A.C. field. Similar results as to spreading of the arc and minimizing the depth of heat penetration into the workpiece may be obtained by using an A.C. welding arc with a D.C. auxiliary field. The auxiliary field may alternatively be a square wave field, sometimes referred to as a D.C. oscillating field. In any event, the frequency relationships specified below must be followed.

As pointed out above, there is a critical relationship between the drop transfer time and the frequency of the transverse oscillation of the arc. This relationship is preferably such that the individual drops passing from the welding electrode to the workpiece complete their transfer in less than one quarter-cycle of the oscillating frequency. The drop transfer time may be as high as one half-cycle of the oscillating frequency without complete loss of the spreading effect. However, if the frequency goes much higher with respect to the drop transfer time, then each individual drop passing between the wire and the workpiece is alternately moved in opposite directions during its transfer time, and is not definitely deflected to either side. The result is that the bead formed on the workpiece has substantially the same contour as would be obtained if there were no oscillation of the arc.

Commonly used spacings between consuming wire electrodes and workpieces vary from 3/16" to 1/2". The drops may be projected with a force of 50 to 60 G. Consequently, the speed of transfer and hence the drop transfer time must be determined empirically and is not determined in accordance with the actual force of gravity. It has been found that the usable range of oscillating frequencies, for arc lengths in the range from 3/16" to 1/2", is from about one-fifth cycle per second to twenty cycles per second. If a high arc current is used, then the drops are projected at higher velocities and the transit time is shorter so that the frequency limits are higher. If low arc current densities are used, then the transit time is greater, approximating that due to gravity alone at the minimum current values. Since the transit time is then higher, the frequency limits are substantially lower.

As pointed out above, it is possible to use sine wave A.C. for the oscillating field. However, it is greatly preferred to use square wave A.C., since the arc then dwells on the opposite sides of the bead and shifts rapidly from one side of the bead to the other. There is less of a tendency for the bead to pile up high in the middle than there is with sine wave A.C.

In the foregoing example, the arc current was stated to be unidirectional (zero frequency). Alternatively, alternating current of any frequency generally suitable for arc welding may be used for the arc current. If A.C. is used for the arc, then the frequency of transverse oscillation of the arc will be the difference frequency, or heterodyne frequency, between the frequency of the arc current and the field current frequency. The limits and other criteria stated above for the frequency of transverse oscillation apply to that difference frequency.

Figure 10:
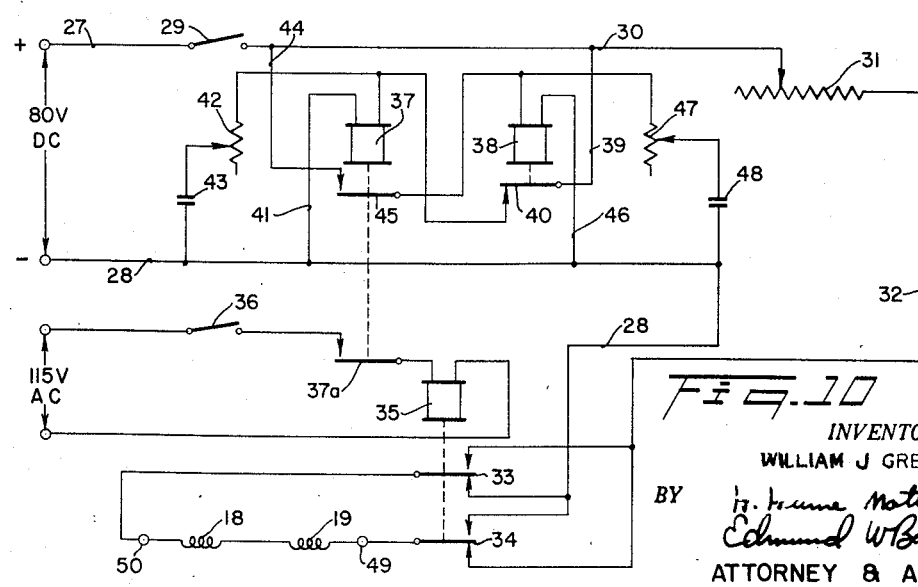
Fig. 10 is a wiring diagram showing a relaxation oscillator circuit suitable for energizing the auxiliary magnetic field in the apparatus of Figs. 1 and 2.

Fig. 10 illustrates a variable frequency power supply source for supplying square wave A.C. in the frequency range indicated. This circuit uses an 80-volt D.C. supply and a 115 volt A.C. supply, both of which are readily obtainable in conventional welding power supply equipment. Direct current is supplied at 80 volts between supply lines 27 and 28. Current flows from supply line 27 through a manually operable switch 29, a wire 30, a variable resistor 31, a wire 32, and one of contacts 33 and 34 of a reversing relay 35, field windings 18 and 19, and the other of contacts 33 and 34 to the power supply line 28. The reversing relay 35 is energized from the A.C. source through a circuit which includes a manually operated switch 36 and a movable contact 37a of a relay 37. The operation of switch contact 37a is controlled by the relay 37 and a companion relay 38. The energizing circuit for relay 37 may be traced from wire 30 through a wire 39, a back contact 40 of relay 38, the winding of relay 37 and a wire 41 to supply line 28. A variable resistor 42 is connected in series with a condenser 43, the combination being connected in parallel with the winding of relay 37. The relay 38 is energized through a circuit which may be traced from wire 30 through a wire 44, a front contact 45 of relay 37, the winding of relay 38 and a wire 46 to the supply line 28. A variable resistor 47 is connected in series with a condenser 48, the combination being connected in parallel with the winding of relay 38.

The relays 37 and 38 together act as a relaxation oscillator, the respective ON and OFF times of the two relays being determined by respective settings of the variable resistors 42 and 47. When relay 37 is energized, its switch 37a is closed and the reversing relay 35 picks up its contacts 33 and 34, thereby connecting the right-hand terminal 49 of the electromagnet winding circuit to the power supply line 28 and connecting the left-hand terminal 50 to the supply line 27. When relay 37 is deenergized, switch 37a is opened, and the reversing relay 45 is deenergized, so that terminal 49 is then connected to power supply line 27 and terminal 50 is connected to power supply line 28. It may be seen that this arrangement supplies the windings 18 and 19 with a square wave A.C. (sometimes termed a D.C. oscillating supply). The lengths of the positive and negative half-cycles of the square wave may be separately adjusted by means of the resistors 42 and 47. The variable resistor 31 determines the magnitude of the current supplied to the windings 18 and 19.

While I have shown and described a preferred embodiment of my invention, other modifications thereof will readily occur to those skilled in the art, and I therefore intend my invention to be limited only by the appended claims.

I claim:

1. A method of electric arc welding, comprising supplying electric current of a predetermined frequency chracteristic to a consuming wire electrode and a workpiece, feeding the wire toward the workpiece to maintain the arc as the metal of the wire is melted and transferred in drops from the electrode to the workpiece, moving said workpiece relative to said arc in a predetermined direction, while creating a magnetic field extending in said predetermined direction and reacting with the magnetic field of the arc current to produce forces tending to move the molten metal of the arc in a direction transverse to said predetermined direction, and varying at least one of said reacting fields cyclically with respect to the other at a frequency differing from said predetermined frequency characteristic by a difference frequency low enough so that the drop transfer time is less than one-half cycle, so that molten metal drops in the arc move alternately to one side and then the other of the line of movement of the electrode along the workpiece, thereby spreading a welded coating of metal of substantial width along both sides of said line of movement.

2. A method of electric arc welding, defined in claim 1, in which said first-mentioned magnetic field is created by disposing two magnetic poles on opposite sides of said arc and spaced therefrom along said predetermined direction in opposite senses.

3. A method of electric arc welding, as defined in claim 1, in which the electric current supplied to the electrode and the workpiece is unidirectional current having a zero frequency characteristic, and the reacting magnetic field is created by supplying a field winding with an alternating electric current.

4. A method of electric arc welding, as defined in claim 1, wherein said difference frequency is between 1/5 cycle per second and 20 cycles per second.

5. The method of electric arc welding as defined in claim 1, in which the electric current supplied to the electrode and the workpiece is unidirectional current having a zero frequency characteristic and the reacting magnetic field is created by supplying a field winding with a square wave alternating current.

6. The method of electric arc welding as defined in claim 1, in which the electric current supplied to the electrode and the workpiece is alternating and the reacting magnetic field is created by supplying a field winding with unidirectional current.

7. A method of electric arc welding as defined in claim 1, in which the electric current supplied to the electrode and the workpiece is alternating and the reacting magnetic field is created by supplying a field winding with a square wave alternating current.

8. A method of electric arc welding as defined in claim 1, in which both the electric current supplied to the electrode and the workpiece and the reacting magnetic field are alternating at frequencies differing by a difference frequency low enough so that the drop transfer time is less than 1/2 cycle.

9. A method of electric arc welding, comprising supplying electric current of a predetermined frequency characteristic to a consuming wire electrode and a workpiece, feeding the wire toward the workpiece to maintain the arc as the metal of the wire is melted and transferred in drops from the electrode to the workpiece, shielding the end of the electrode, the arc, and the molten metal produced thereby with a flowing stream of inert gas, moving said workpiece relative to said arc in a predetermined direction, while creating a magnetic field extending in said predetermined direction and reacting with the magnetic field of the arc current to produce forces tending to move the molten metal of the arc in a direction transverse to said predetermined direction, and varying at least one of said reacting fields cyclically with respect to the other at a frequency differing from said predetermined frequency characteristic by a difference frequency low enough so that the drop transfer time is less than one half-cycle, so that molten metal drops in the arc move alternately to one side and then the other of the line of movement of the arc along the workpiece, thereby spreading a welded coating of metal of substantial width along both sides of said line of movement.

10. In the process of electric arc welding with a consumable wire electrode wherein the metal of the electrode is melted by the heat of the arc and transferred across the arc between the end of said electrode and the work in the form of drops, the improvement which comprises creating a cyclically reversing magnetic field substantially transverse to the axis of said electrode at a reversal frequency such that the drop transfer time across said arc is less than the time of one half cycle to cause the arc and the drops transferring across said arc to be deflected alternately to one side and then to the other side of the axis of said electrode.

References Cited in the file of this patent

UNITED STATES PATENTS

| | | |
|---|---|---|
| 1,792,243 | Richter | Feb. 10, 1931 |
| 2,152,194 | Jones | Mar. 28, 1939 |
| 2,694,763 | Muller | Nov. 16, 1954 |
| 2,844,705 | Bowman et al. | July 22, 1958 |